No. 689,303. Patented Dec. 17, 1901.
S. N. HALL.
BICYCLE PROPULSION.
(Application filed Aug. 20, 1901.)
(No Model.) 2 Sheets—Sheet 1.
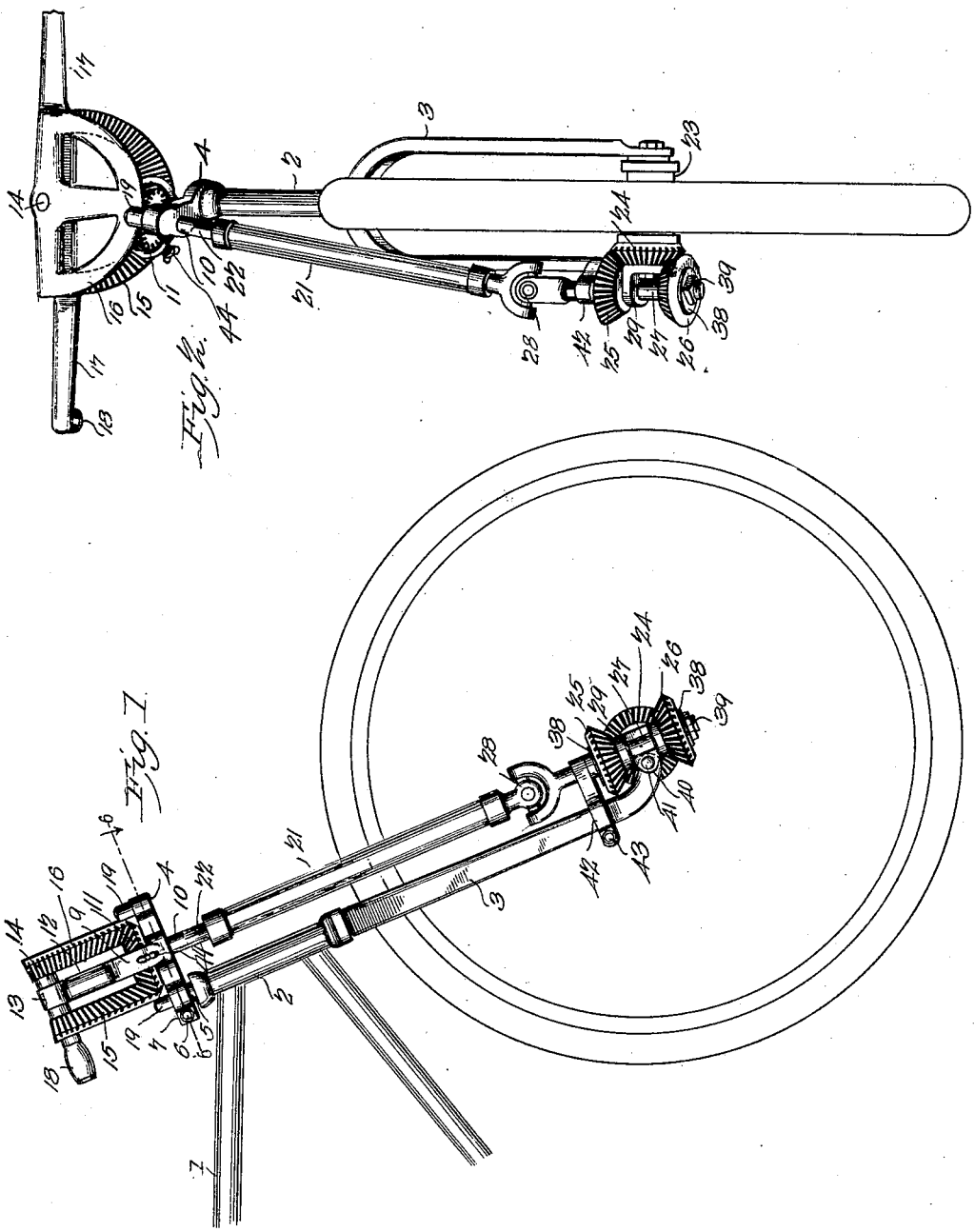

No. 689,303.  
S. N. HALL.  
BICYCLE PROPULSION.  
(Application filed Aug. 20, 1901.)  
Patented Dec. 17, 1901.
(No Model.)  
2 Sheets—Sheet 2.
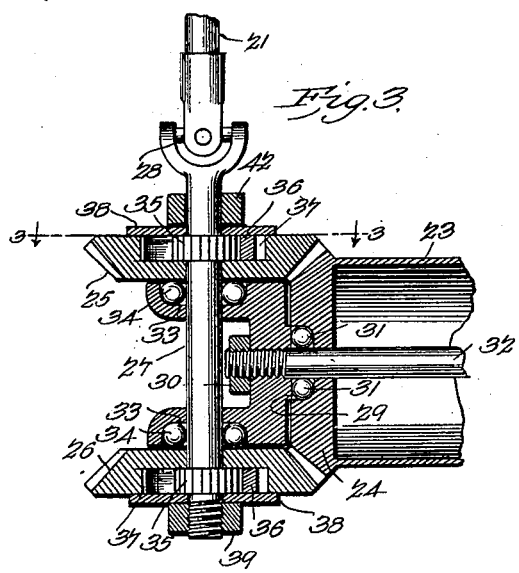
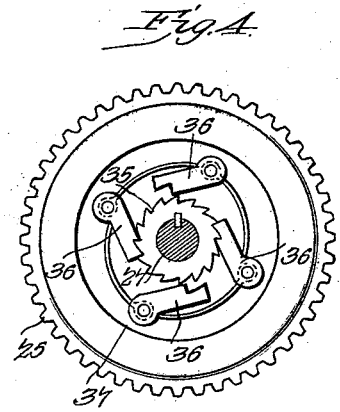
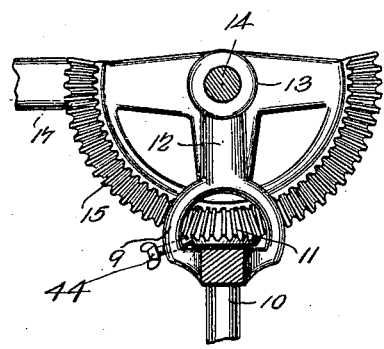
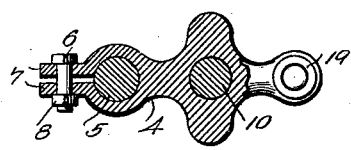
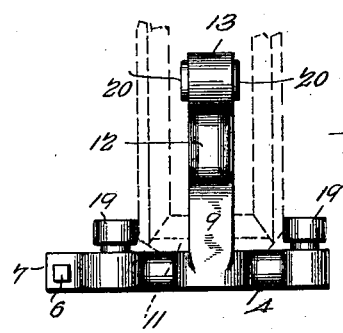
Witnesses:  
S. N. Hall, Inventor:  
by  
Attorneys.
THE NORRIS PETERS CO., PHOTO-LITHO., WASHINGTON, D. C.

UNITED STATES PATENT OFFICE.

SAM N. HALL, OF HOLLYGROVE, ARKANSAS, ASSIGNOR OF ONE-HALF TO RUDOLPH ABRAMSON, OF HOLLYGROVE, ARKANSAS.

BICYCLE PROPULSION.

SPECIFICATION forming part of Letters Patent No. 689,303, dated December 17, 1901.

Application filed August 20, 1901. Serial No. 72,688. (No model.)

*To all whom it may concern:*

Be it known that I, SAM N. HALL, a citizen of the United States, residing at Hollygrove, in the county of Monroe and State of Arkansas, have invented a new and useful Bicycle Propulsion, of which the following is a specification.

This invention relates to bicycles, and more particularly to the propulsion mechanism therefor.

The object of this invention is to provide a novel form of adjunctive propulsion mechanism to be used at will in conjunction with the ordinary driving mechanism, the adjunctive mechanism to be operated by the hands of the rider, and to be so disposed and operated in such manner as, by an output of a minimum amount of power, to obtain the maximum of driving force.

Generally stated, the propulsion mechanism characterizing the present invention comprises a train of double-acting gears associated with the axle of the front wheel, oppositely-operable gears operated by the handle-bars, and connections between the front-wheel gearing and the handle-bar gearing—whereby upon the handle-bars being moved through upward and downward arcs at right angles to the front wheel the latter will be positively driven on both movements of the handle-bars.

With the above and other objects in view, as will appear as the nature of the invention is better understood, the same consists in the novel construction and combination of parts of a bicycle driving mechanism, as will be hereinafter fully described, and specifically pointed out in the claims.

In the accompanying drawings, forming a part of this specification, and in which like numerals of reference indicate corresponding parts, I have illustrated a form of embodiment of my invention capable of carrying my invention into effect, it being understood that the elements herein exhibited may be varied or changed as to shape, proportion, and exact manner of assemblage without departing from the scope of my invention, and in the drawings—

Figure 1 is a view in side elevation of the front portion of a bicycle, showing my improvement in coöperative relation with the front wheel thereof. Fig. 2 is a view in front elevation. Fig. 3 is a detached detail view, on an enlarged scale, exhibiting the ratchet mechanism and ball-bearings therefor. Fig. 4 is a view in horizontal section taken on the line 3 3, Fig. 3, and looking in the direction of the arrow thereon, the view exhibiting merely one of the driving-gears and its ratchet mechanism. Fig. 5 is an enlarged detail view, partly in section, exhibiting one of the segmental driving-gears carried by one of the handle-bars. Fig. 6 is a horizontal sectional view taken on the line 6 6, Fig. 1, and looking in the direction of the arrow thereon. Fig. 7 is an enlarged detached detail view in elevation of the bracket for supporting the handle-bars and the mechanism coacting therewith.

Referring to the drawings, 1 designates a portion of the supporting-frame carrying the ordinary steering-post 2. It is to be understood that the present invention is applicable to a bicycle of any make and employing any form of foot driving mechanism, such as the ordinary sprocket chain and wheel or the chainless driving mechanism, and as this will be well understood illustration of the rear portion of the bicycle is deemed unnecessary. The steering head-post carries the ordinary front fork 3, the upper end of which projects above the steering-post 2 and has detachably connected with it a bracket 4. (Shown in its operative position in Fig. 1 and in detached detail in Fig. 7.) The bracket 4, as shown in section in Fig. 6, has its rear portion slit and orificed for the reception of the upper end 5 of the fork, a bolt 6, passed through the ears 7 of the bracket and carrying a nut 8, serving to clamp the bracket securely upon the fork. The bracket is provided intermediate of its ends with a yoke 9, the base of which is orificed to receive a shaft 10, carrying on its upper end a beveled gear 11. The bracket is further provided with a standard 12, constituting a continuation of the yoke, the standard being provided at its upper end with a transversely-orificed head 13, in which works a shaft 14, upon which are mounted the two segmental driving-gears 15 and 16, by which motion is imparted to the gear 11 and thence through mechanism, presently to be described, to the front wheel. Each segmental gear has associated with it a projection 17, constituting a handle-bar, each bar being provided at its outer extremity with a handle 18, by which motion is imparted to the gears 15 16. As herein shown, the handle-bars constitute an integral part of the segmental gears; but it is to be understood that, if preferred, these bars may be made separate elements and then suitably associated with the gears. In order that the handles 18 may both occupy the same transverse line, or, in other words, be in transverse alinement, the handle-bar of the gear 16 is bent rearward into line with the gear 15 and then at right angles thereto, so that viewed from above both of the handle-bars will be in alinement. As will be understood, the gears 15 and 16 will be loose on the shaft 14, and in order that these gears may be kept in operative engagement with the gear 11 the bracket is provided with two vertically-disposed friction-rollers 19, which, as shown in Figs. 1 and 7, bear against the outer sides of the said gears, and thus in a readily-appreciable manner effect the object designed. To prevent any interference between the gears 15 and 16 and the standard 12, the head 13 of the latter is provided with extensions 20, which, as shown in Fig. 1, bear against the opposed faces of the web of the gears and effect proper working thereof. Instead of providing the head with the extensions 20 spacing-collars may be placed upon the shaft 14 for the same purpose.

The shaft 10 projects into and has a telescopic connection with the upper end of a tubular shaft 21, and in order that motion from the shaft 10 to the shaft 21 may be positively transmitted any suitable or preferred form of connection between the parts may be employed, the means adopted in this instance for the purpose being to square the lower portion of the shaft 10, as at 22, and to provide a similarly-shaped opening in the upper end of the tubular shaft to receive the squared portion. It will be obvious, however, that the parts may be associated by a slot-and-key connection, as is usual in associating two elements of this character, or, if preferred, the tubular shaft may carry a locking-bolt to bear against or engage with the seat in the shaft 4. The object of the telescopic connection between the two shafts is to permit of adjustment of the attachment to suit the rider, it being only necessary to effect raising or lowering of the attachment to loosen the nut 8 of the bracket 4, adjust the bracket on the upper end of the fork 3, and again tighten the nut 8.

A hub 23 of the wheel is provided on one end with a miter-gear 24, which is adapted to mesh with two similar gears 25 and 26, carried by a vertical shaft 27, that receives motion from the shaft 21, the connection between the shaft 27 and the shaft 21 being effected by the employment of a universal coupling 28 of the usual or any preferred construction, the employment of this coupling being rendered necessary from the fact that, as will be seen by reference to Fig. 2, the shaft 21 is pitched at an angle to the wheel. While not herein shown, it will be obvious that the gears 24, 25, and 26 may be inclosed in a suitable housing, thereby to shield them from dirt and to aid in giving a neat and finished appearance to the wheel.

To reduce the friction between the gears 24, 25, and 26 and also to facilitate the easy driving of the gears 25 and 26, a ball-bearing race 29 is combined with the three gears named and is housed within the rectangular opening formed therebetween, as clearly shown in Fig. 3. The ball-race 29 is held in position against the gear 24 by the axle-nut 30, the outer face of the gear 24 being chambered, as at 30, to receive the balls 31, that surround the axle 32, these balls also bearing against the rear side of the race. The periphery of the race is provided with a circumferential groove 33, in which are mounted two series of balls 34, that bear, respectively, against the opposed faces of the gears 25 and 26 and against the shaft 27 on opposite sides thereof, the ball-race being vertically orificed for the reception of the shaft 27, as clearly shown in Fig. 3. In order that motion may be imparted to the front wheel upon movement of the handle-bars in both directions, there is associated with each of the gears 25 and 26 a suitable ratchet mechanism, the two mechanisms being alternately operable—that is to say, upon upward movement of the handle-bars the ratchet mechanism of one of the gears will be locked to drive the hub 23 and the other ratchet mechanism will be inoperative, and vice versa. The ratchet mechanism herein shown is one of many forms that may be employed for the purpose, and consists in each instance of a ratchet-wheel 35, keyed or otherwise rigidly secured to the shaft 27, and four spring-pressed pawls 36 to engage with the teeth of the ratchet-wheels, these pawls to be timed so that there will be no lost motion in the operation of the device. The ratchet-wheels 35 and the pawls 36, together with their actuating-springs, are housed in chambers 37 in the outer faces of the gears 25 and 26, a cap-plate 38 being provided to cover each of the chambers, as shown in Fig. 3, thereby to effect the exclusion of dust or dirt from the mechanism, a nut 39, screwed onto the lower end of the shaft 27, serving to hold all the parts coacting with the shaft in proper relation to each other.

As a means for supporting the shaft 27 from the fork 3 I provide the ball-race with an offset 40, which is securely attached to the lower end of the fork by a bolt 41, (clearly shown in Fig. 1,) and in order further to brace the shaft 27, so as to render its operation positive under all conditions, I provide a bracket 42, the rear end of which is slit to straddle the fork and is held firmly in position thereon by a binding-bolt 43, the forward end of the bracket 42 being provided with an orifice, in which the shaft works, as clearly shown in Fig. 3.

To lock the gear 11 against rotation, thereby rigidly to hold the handle-bars at any desired adjustment when the same are not employed for purposes of propulsion, a set-screw 44 is provided, which projects through the yoke 9 and is adapted to bear against the beveled side of the gear 11, as clearly shown in Fig. 5.

From the foregoing description it is thought that the operation of the attachment will be readily understood. Under ordinary conditions, as where the wheel is being propelled over smooth level roads, the adjunctive propulsion mechanism will remain idle; but as soon as an upgrade is reached the rider will, in conjunction with the pedal mechanism, operate the handle-bars, and by this double application of power the machine may be readily propelled up grades that would ordinarily be difficult, if not impossible, of ascent.

Having thus fully described my invention, what I claim as new, and desire to secure by Letters Patent, is—

1. A propulsion mechanism for bicycles comprising a train of oppositely-operable gears associated with the axle of the front wheel, oppositely-operable gears carried by the handle-bars, and connections between the wheel-gearing and handle-bar gearing, whereby upon the handle-bars being moved simultaneously through upward and downward arcs, at right angles to the front wheel, the latter will be positively driven on both movements of the handle-bars.

2. A propulsion mechanism for bicycles comprising two pivoted segmental gears each carrying a handle-bar, the handle-bars being adapted for simultaneous movement through upward and downward arcs, a bevel-gear in mesh with the segmental gears, a train of oppositely-operable bevel-gears associated with the front-wheel axle, and a shaft connecting the said train of gearing with the bevel-gear that meshes with the segmental gears.

3. A propulsion mechanism for bicycles comprising two pivoted segmental gears each carrying a handle-bar, a bevel-gear in mesh with the segmental gears, a train of oppositely-operable bevel-gears associated with the front-wheel axle, and a telescopic shaft including a universal joint connecting the wheel-gearing and the handle-bar gearing.

4. A propulsion mechanism for bicycles comprising two pivoted segmental gears each carrying a handle-bar, a bevel-gear in mesh with the segmental gears, a bevel-gear associated with the hub of the front wheel, two bevel-gears in mesh with the hub-gears and having ratchet mechanism associated therewith to render the gears alternately operable, and a shaft including a universal joint connecting the wheel-gearing and the handle-bar gearing.

5. The combination with the steering-post of a bicycle, of a bracket supported thereby and adjustable thereon, a standard carried by the bracket and supporting a transverse shaft, two handle-bars having segmental gears pivoted on the shaft, a shaft disposed at right angles to the first-named shaft and carrying a bevel-gear in mesh with the segmental gears, means on the bracket for keeping the segmental gears in mesh with the bevel-gear, a tubular shaft having a telescopic connection, at one end, with the shaft of the bevel-gear, a train of oppositely-operable gears, including ratchet mechanism, associated with the front-wheel hub, and a universal joint connecting the tubular shaft and the shaft of the wheel-operating train of gears.

In testimony that I claim the foregoing as my own I have hereto affixed my signature in the presence of two witnesses.

SAM N. HALL.

Witnesses:
J. M. JOHNSON,
L. G. RENFRO.